US012093307B2

(12) United States Patent
Hu et al.

(10) Patent No.: US 12,093,307 B2
(45) Date of Patent: Sep. 17, 2024

(54) IMAGE DATA INVOKING METHOD AND SYSTEM FOR APPLICATION, ELECTRONIC DEVICE, AND STORAGE MEDIUM

(71) Applicant: Honor Device Co., Ltd., Shenzhen (CN)

(72) Inventors: Shuhong Hu, Shenzhen (CN); Lu Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/919,888

(22) PCT Filed: Jan. 28, 2022

(86) PCT No.: PCT/CN2022/074836
§ 371 (c)(1),
(2) Date: Oct. 19, 2022

(87) PCT Pub. No.: WO2022/262291
PCT Pub. Date: Dec. 22, 2022

(65) Prior Publication Data
US 2024/0211509 A1    Jun. 27, 2024

(30) Foreign Application Priority Data

Jun. 15, 2021  (CN) .......................... 202110662802.9
Sep. 29, 2021  (CN) .......................... 202111152831.7

(51) Int. Cl.
*G06F 16/54*    (2019.01)
*G06F 16/55*    (2019.01)
(Continued)

(52) U.S. Cl.
CPC .............. *G06F 16/55* (2019.01); *G06F 16/54* (2019.01); *G06T 1/20* (2013.01); *G06T 1/60* (2013.01); *G06T 3/40* (2013.01)

(58) Field of Classification Search
CPC . G06F 16/55; G06F 16/54; G06T 1/20; G06T 1/60; G06T 3/40
See application file for complete search history.

(56) References Cited

U.S. PATENT DOCUMENTS 9,544,497 B2    1/2017  Forutanpour et al.
11,790,534 B2 *  10/2023  Du ........................... G06T 1/20
                                                        382/157
(Continued)

FOREIGN PATENT DOCUMENTS

CN    105118020 A    12/2015
CN    105704403 A    6/2016
(Continued)

OTHER PUBLICATIONS

Xie, Z., "Research And Implementation of Android Graphics Display System Improvement", Wuhan University of Technology: Hubei National 211 Project Universities directly under the Ministry of Education, Jan. 2015, 36 pages.
(Continued)

*Primary Examiner* — Jorge A Casanova
(74) *Attorney, Agent, or Firm* — Slater Matsil, LLP

(57) ABSTRACT

This application relates to an image data invoking method and system for an application, an electronic device, and a storage medium. When the electronic device identifies an entry file HalSensorList.cpp of a sensor, an image with an image resolution of binning size is filled. The electronic device obtains an image with an image resolution of binning size from a preview mode library at a kernel layer, fills an MTK_SCALER_AVAILABLE_STREAM_CONFIGURATIONS_WITH_DURATIONS tag at a Hal layer with the image with an image resolution of binning size, and reports the binning size of the MTK_SCALER_AVAILABLE_STREAM_CONFIGURATIONS_WITH_DURATIONS tag at the Hal layer to an android.scaler.avail- (Continued)

ableStreamConfigurations tag at a framework layer. An application obtains the image with an image resolution of binning size with which the android.scaler.availableStreamConfigurations tag at the framework layer is filled from the android.scaler.availableStreamConfigurations tag.

20 Claims, 9 Drawing Sheets

(51) Int. Cl.
*G06T 1/20* (2006.01)
*G06T 1/60* (2006.01)
*G06T 3/40* (2024.01)

(56) References Cited

U.S. PATENT DOCUMENTS

| | | | |
|---|---|---|---|
| 2016/0142629 A1 | 5/2016 | Jung et al. | |
| 2017/0262994 A1* | 9/2017 | Kudriashov | G06T 7/11 |
| 2020/0020067 A1* | 1/2020 | Liang | G06T 15/005 |
| 2020/0211148 A1* | 7/2020 | Mackinnon | G06T 11/40 |
| 2020/0258195 A1 | 8/2020 | Chuang et al. | |
| 2022/0180543 A1* | 6/2022 | Ling | G06T 7/521 |
| 2022/0375027 A1* | 11/2022 | Ahn | G06T 3/40 |
| 2023/0033306 A1 | 2/2023 | Xu | |
| 2023/0419570 A1* | 12/2023 | Chen | G06T 1/20 |

FOREIGN PATENT DOCUMENTS

| | | |
|---|---|---|
| CN | 107172363 A | 9/2017 |
| CN | 110944160 A | 3/2020 |
| CN | 111147693 A | 5/2020 |
| CN | 111881315 A | 11/2020 |
| CN | 112153293 A | 12/2020 |
| CN | 112381918 A | 2/2021 |
| IN | 201647034206 A | 11/2016 |
| WO | 2018137267 A1 | 8/2018 |

OTHER PUBLICATIONS

Jianjun Yin et al;"Design and experiment of wireless image sensor node with real-time adjustable resolution"; Transactions of the Chinese Society of Agricultural Engineering; Feb. 8, 2017;8 pages(with English abstract).

N. Sathish Kumar et al;"IOT Based Smart Garbage alert system using Arduino UNO"; 2016 IEEE Region 10 Conference (TENCON);Feb. 9, 2017;7 pages.

Anonymous;"Extracting and using Image Thumbnail from larger picture in android app"; Retrieved from the internet, URL:https://stackoverflow.com/questions/36434381/extracting-and-using-image-thumbnail-from-larger-picture-in-android-app;Apr. 5, 2016;2 pages.

* cited by examiner

FIG. 7

IMAGE DATA INVOKING METHOD AND SYSTEM FOR APPLICATION, ELECTRONIC DEVICE, AND STORAGE MEDIUM

CROSS-REFERENCE TO RELATED APPLICATIONS

This application is a national stage of International Application No. PCT/CN2022/074836, filed on Jan. 28, 2022, which claims priority to Chinese Patent Application No. 202110662802.9, filed on Jun. 15, 2021, and claims priority to Chinese Patent Application No. 202111152831.7, filed on Sep. 29, 2021. The disclosures of each of the aforementioned applications are hereby incorporated by reference in their entireties.

TECHNICAL FIELD

This application relates to the field of data transmission technologies, and in particular, to an image data invoking method and system for an application, an electronic device, and a storage medium.

BACKGROUND

At present, some applications on the market, such as photoshop image processing software and phthon image processing software, obtain a full size (FullSize) image with which the Android (Android) system is filled from the Android system when invoking image data. However, as the camera resolution is growing, the full size is also growing. As a result, a full size image invoked by an application after processing exceeds the available memory of the application, and the Android system kills the application, causing a crashing problem of the application.

SUMMARY

In view of the above, it is necessary to provide an image data invoking method and system for an application, an electronic device, and a storage medium, to avoid a crashing problem of an application caused by the application invoking image data with an excessive resolution.

In a first aspect, this application provides an image data invoking system for an application. The system includes: a capture mode library, set in a kernel layer, where the capture mode library is filled with an image with a resolution size of full size; a preview mode library, set in the kernel layer, where the capture mode library is filled with an image with a resolution size of binning size, where binning size is smaller than full size; a first tag, set in a hardware abstraction layer, where the first tag is filled with an image with a resolution size of binning size; a second tag, set in an application framework layer, wherein the second tag obtains the image with an image resolution of binning size from the first tag; and an application, set at an application layer, wherein the application obtains the image with an image resolution of binning size from the second tag. The resolution size of the image obtained by the application of this application from the second tag at the application framework layer is binning size, and the image with the resolution size of binning size invoked by the application does not exceed the available memory of the application, so as to avoid the crashing problem of the application.

In a possible implementation, the system further includes a third tag, the third tag is set in the hardware abstraction layer, the third tag includes three subtags, and the three subtags obtain the image with an image resolution of binning size from the preview mode library. Through the foregoing technical solution, the three subtags of the third tag in the hardware abstraction layer obtain the image with an image resolution of binning size from the preview mode library at the kernel layer.

In a possible implementation, the system further includes a fourth tag, the fourth tag is set in the application framework layer, the fourth tag includes three subtags, the three subtags of the fourth tag correspond to the three subtags of the third tag, and each subtag of the fourth tag obtains the image with an image resolution of binning size from the corresponding subtag of the third tag. Through the foregoing technical solution, the each subtag of the fourth tag in the application framework layer obtains the image with an image resolution of binning size from the corresponding subtag of the third tag, which may meet a test requirement of a compatibility testing tool.

In a possible implementation, the image resolution size includes a width of the image and a height of the image.

In a possible implementation, when the system identifies an entry file HalSensorList.cpp of a sensor, a preview width and a preview height of the image are filled into the preview mode library, where the preview width is a width of the image with a resolution size of binning size, and the preview height is a height of the image with a resolution size of binning size. Through the foregoing technical solution, when the system identifies the entry file HalSensorList.cpp of the sensor, the width and height of the image with an image resolution of binning size may be filled into the preview mode library.

In a possible implementation, the system fills the preview width of the image into the preview mode library through an instruction statement entryA.push_back (pSensorStaticInfo→captureWidth, Type2Type<MINT32>( )), and fills the preview height of the image into the preview mode library through an instruction statement entryA.push_back (pSensorStaticInfo→captureHeight, Type2Type<MINT32>( )). In the foregoing technical solution, the width and height of the image with an image resolution of binning size are filled into the preview mode library through the instruction statement.

In a possible implementation, the application invokes the image with an image size of full size from the capture mode library in a high pixel mode. Through the foregoing technical solution, the application may invoke a full size image from the capture mode library as image data in the high pixel mode.

In a possible implementation, image data and image parameter data are stored in the capture mode library and the preview mode library, and the image parameter data includes at least quality parameters.

In a second aspect, an embodiment of this application provides an image data invoking method for an application. The method includes: filling a preview mode library at a kernel layer with an image with a resolution size of binning size, and filling a capture mode library at the kernel layer with an image with a resolution size of full size, where binning size is smaller than full size; filling a first tag at a hardware abstraction layer with an image with a resolution size of binning size; obtaining, by three subtags of a third tag at the hardware abstraction layer, the image with a resolution size of binning size from the preview mode library; obtaining, by a second tag at an application framework layer, the image with an image resolution of binning size from the first tag; and obtaining, by an android.sensor.info.activeArraySize tag at the application framework layer, the image with an image resolution of binning size from an Active Array- Size tag; and obtaining, by three subtags of a fourth tag at the application framework layer, the image with an image resolution of binning size from the three subtags of the third tag at the hardware abstraction layer correspondingly.

In a possible implementation, the image resolution size includes a width of the image and a height of the image.

In a possible implementation, the method further includes: when an entry file HalSensorList.cpp of a sensor is identified, filling a preview width and a preview height of the image into the preview mode library, where the preview width is a width of the image with a resolution size of binning size, and the preview height is a height of the image with a resolution size of binning size. Through the foregoing technical solution, when the system identifies the entry file HalSensorList.cpp of the sensor, the width and height of the image with an image resolution of binning size may be filled into the preview mode library.

In a possible implementation, the method further includes: filling the preview width of the image into the preview mode library through an instruction statement entryA.push_back (pSensorStaticInfo→captureWidth, Type2Type <MINT32>( )); and filling the preview height of the image into the preview mode library through an instruction statement entryA.push_back (pSensorStaticInfo→captureHeight, Type2Type <MINT32>( )). In the foregoing technical solution, the width and height of the image with an image resolution of binning size are filled into the preview mode library through the instruction statement.

In a possible implementation, the method further includes: invoking, by the application, the image with an image size of full size from the capture mode library in a high pixel mode. Through the foregoing technical solution, the application may invoke a full size image from the capture mode library as image data in the high pixel mode.

In a possible implementation, image data and image parameter data are stored in the capture mode library and the preview mode library, and the image parameter data includes at least quality parameters.

In a third aspect, an embodiment of this application provides an electronic device, including a processor and a memory, where the processor is coupled to the memory; the memory is configured to store program instructions; and the processor is configured to read the program instructions stored in the memory, to implement the foregoing image data invoking method for an application.

In a fourth aspect, an embodiment of this application provides a computer storage medium. The computer-readable storage medium stores program instructions. The program instructions, when run on an electronic device, cause the electronic device to perform the foregoing image data invoking method for an application.

In addition, for the technical effects brought by the third aspect to the fourth aspect, reference may be made to the descriptions related to the design methods in the foregoing method section. Details are not described herein again.

BRIEF DESCRIPTION OF THE DRAWINGS

To describe the technical solutions in the embodiments of this application more clearly, the following briefly describes the accompanying drawings required for the embodiments.

FIG. 7 is a schematic diagram of codes of a fill layer in a preview mode library according to an embodiment of this application.

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the quantity of indicated technical features. Therefore, features defining "first" and "second" may explicitly or implicitly include one or more such features. In descriptions of some embodiments of this application, the word "exemplarily" or "for example" is used to represent giving an example, an illustration, or a description. Any embodiment or design scheme described as an "exemplarily" or "for example" in some embodiments of this application should not be explained as being more preferred or having more advantages than another embodiment or design scheme. Exactly, use of the word "exemplarily" or "for example" or the like is intended to present a related concept in a specific manner.

Unless otherwise defined, meanings of all technical and scientific terms used in this specification are the same as those usually understood by a person skilled in the art to which this application belongs. The terms used in the specification of this application are merely used for describing specific embodiments, and are not intended to limit this application. It should be understood that unless otherwise specified in this application, "/" means or. For example, A/B may represent A or B. The term "and/or" in some embodiments of this application describes only an association relationship for describing associated objects and represents that three relationships may exist. For example, A and/or B may represent the following three cases: Only A exists, both A and B exist, and only B exists. The term "at least one" refers to one or more. The term "a plurality of" refers to two or more. For example, at least one of a, b, or c may represent the following seven cases: a, b, c, a and b, a and c, b and c, and a, b and c.

Figure 1:
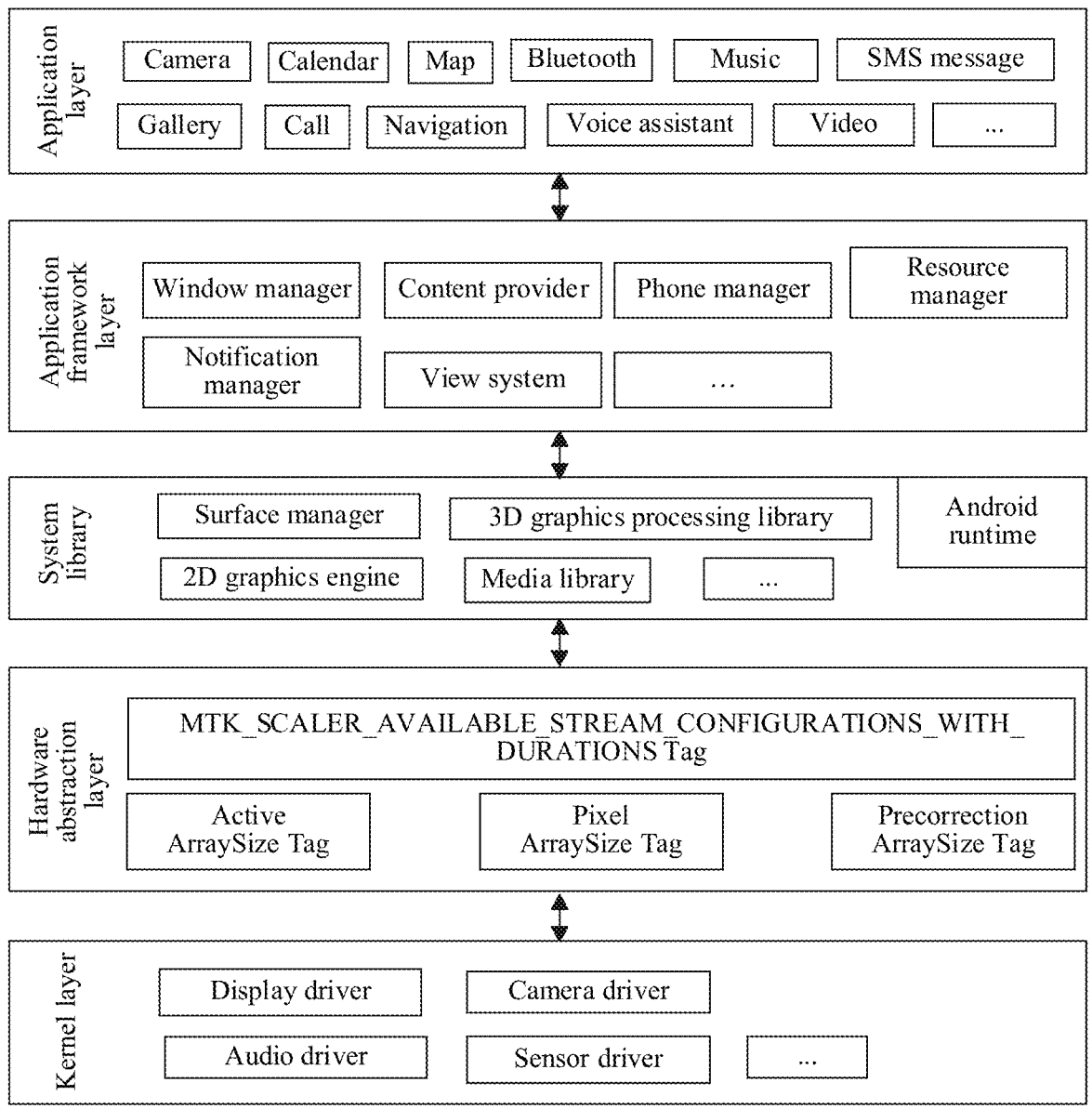
FIG. 1 is a block diagram of a software structure of an electronic device according to an embodiment of this application.

This application provides an image data invoking method for an application. The image data invoking method for an application is applied to an electronic device 100 or a MediaTek (referred to as MTK) platform. FIG. 1 shows a block diagram of a software structure of an electronic device 100 according to an embodiment of this application. In a layered architecture, software is divided into several layers, and each layer has a clear role and task. Layers communicate with each other through a software interface. In some embodiments, an Android system of the electronic device 100 is divided into five layers, from top to bottom, an application (Application) layer, an application framework (Application Framework) layer, an Android runtime (Android runtime) and system library, a hardware abstraction layer (Hardware Abstraction layer, HAL), and a kernel (Kernel) layer.

The application layer may include a series of applications. As shown in FIG. 1, the applications may include applications such as camera, gallery, calendar, call, map, navigation, WLAN, Bluetooth, music, video, and SMS message. In this embodiment, the applications may be third-party applications. The third-party applications are programs developed by non-mobile phone manufacturers, which can expand application functions of mobile phones.

The application framework layer provides an application programming interface (application programming interface, API) and a programming framework for the applications at the application layer. The application framework layer includes some predefined functions.

As shown, the application framework layer may include a window manager, a content provider, a view system, a phone manager, a resource manager, a notification manager, and the like.

The window manager is configured to manage a window application. The window manager may obtain a size of a display, determine whether there is a status bar, lock the screen, capture the screen, and the like.

The content provider is configured to store and obtain data, so that the data may be accessed by an application. The data may include a video, an image, an audio, calls made and answered, a browsing history and bookmarks, an address book, and the like.

The view system includes a visual control such as a control for text display or a control for picture display. The view system may be configured to construct an application. A display interface may be formed by one or more views. For example, a display interface including an SMS notification icon may include a view for displaying text and a view for displaying a picture.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, an intelligent terminal vibrates, or an indicator light flashes.

The Android Runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, such as a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D and 3D layers to a plurality of applications.

The media library supports playback and recording in a plurality of common audio and video formats, a static image file, and the like. The media library may support a plurality of audio and video encoding formats such as MPEG4, G.264, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D drawings.

The hardware abstraction layer is a software layer in which an upper application shields an operation of underlying hardware in the Android system. The hardware abstraction layer includes at least an MTK_SCALER_AVAILABLE_STREAM_CONFIGURATIONS_WITH_DURATIONS tag (Tag), an Active ArraySize tag, a Pixel ArraySize tag, and a Precorrection ArraySize tag.

The kernel layer is a layer between hardware and software. The kernel layer includes at least a display drive, a camera drive, an audio drive, and a sensor drive.

Figure 2:
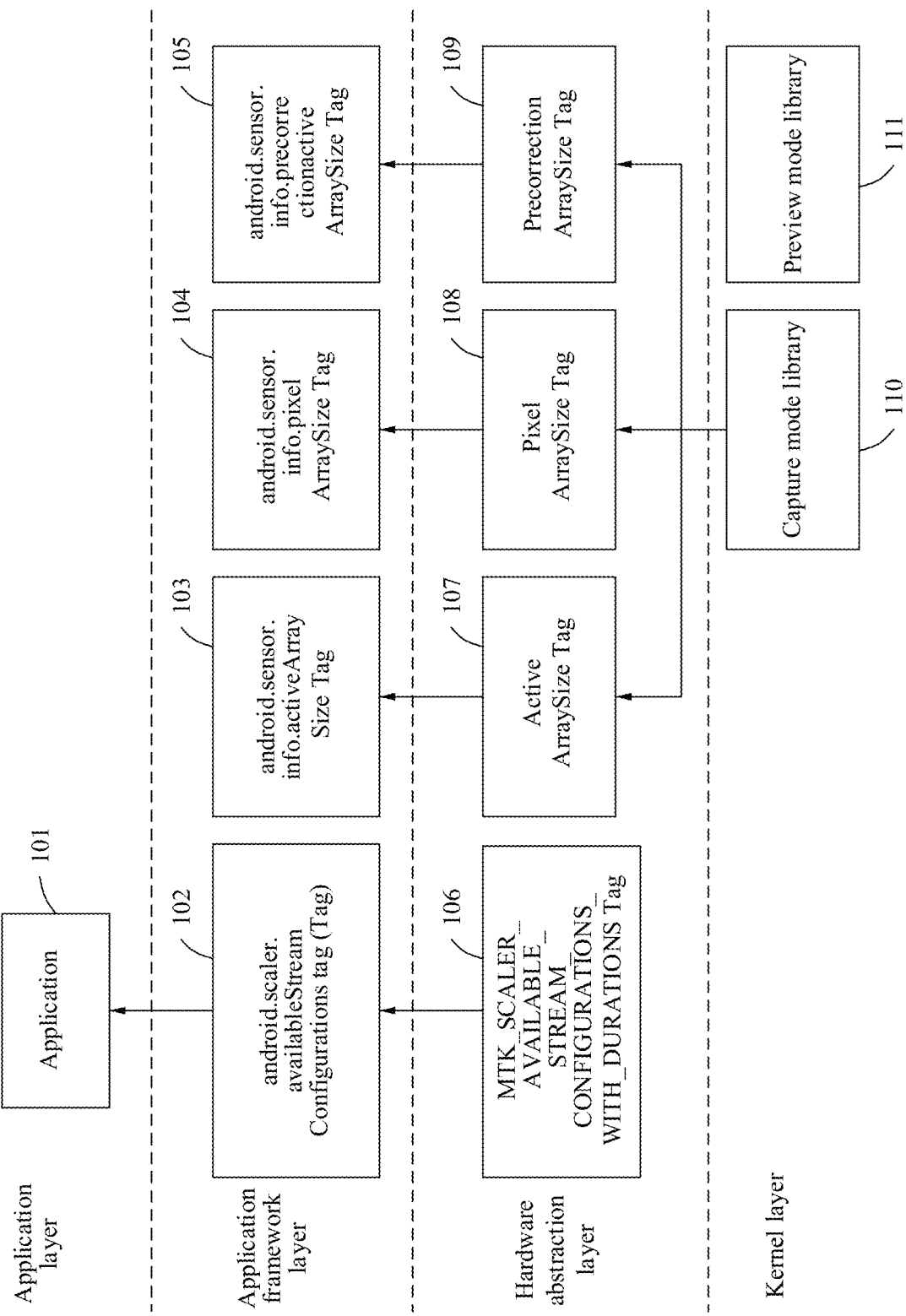
FIG. 2 is a structural block diagram of an image data invoking system for an application according to an embodiment of this application.

FIG. 2 is a structural block diagram of an image data invoking system 100 for an application according to an embodiment of this application. The image data invoking system 100 for an application includes an application 101, an android.scaler.availableStreamConfigurations tag (Tag) 102, an android.sensor.info.activeArraySize tag 103, an android.sensor.info.pixelArraySize tag 104, an android.sensor.info.precorrectionactiveArraySize tag 105, an MTK_SCALER_AVAILABLE_STREAM_CONFIGURATIONS_WITH_DURATIONS tag 106, an Active ArraySize tag 107, a Pixel ArraySize tag 108, a Precorrection ArraySize tag 109, a capture mode library 110, and a preview mode library 111. In this embodiment, for ease of description, the MTK_SCALER_AVAILABLE_STREAM_CONFIGURATIONS_WITH_DURATIONS tag 106 is a first tag, and the android.scaler.availableStreamConfigurations tag 102 is a second tag. The Active ArraySize tag 107, the Pixel ArraySize tag 108, and the Precorrection ArraySize tag 109 are a third tag, and any one of the Active ArraySize tag 107, the Pixel ArraySize tag 108, and the Precorrection ArraySize tag 109 is a subtag of the third tag. The android.sensor.info.activeArraySize tag 103, the android.sensor.info.pixelArraySize tag 104, and the android.sensor.info.precorrectionactiveArraySize tag 105 are a fourth tag, and any one of the android.sensor.info.activeArraySize tag 103, the android.sensor.info.pixelArraySize tag 104, and the android.sensor.info.precorrectionactiveArraySize tag 105 is a subtag of the fourth tag.

The application 101 is located at the application layer of the electronic device 100 or the MTK platform. The second tag, namely the android.scaler.availableStreamConfigurations tag 102, and the fourth tag, namely the android.sensor.info.activeArraySize tag 103, the android.sensor.info.pixelArraySize tag 104, and the android.sensor.info.precorrectionactiveArraySize tag 105 are located at the application framework layer of the electronic device 100 or the MTK platform. The first tag, namely the MTK_SCALER_AVAILABLE_STREAM_CONFIGURATIONS_WITH_DURATIONS tag 106, and the third tag, namely the Active ArraySize tag 107, the Pixel ArraySize tag 108, and the Precorrection ArraySize tag 109 are located at the hardware abstraction layer of the electronic device 100 or the MTK platform. The capture mode library 110 and the preview mode library 111 are located at the kernel layer of the electronic device 100 or the MTK platform. Image data and image parameter data are stored in the capture mode library 110 and the preview mode library 111. The image parameter data includes at least quality parameters such as a color parameter and a white balance parameter.

Figure 3:
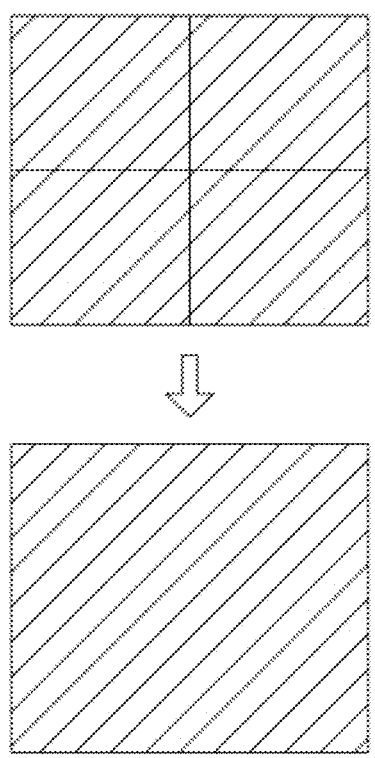
FIG. 3 is a schematic diagram of an image of binninig size according to an embodiment of this application.

In this embodiment, the image data in the capture mode library 110 is used by default for a high pixel mode of a self-developed camera. The image data in the preview mode library 111 is used for other modes other than the high pixel mode of the self-developed camera or invoked by the application 101. In this embodiment, when the application 101 invokes image data, the electronic device 100 or the MTK platform fills the capture mode library 110 with an image with a resolution size of full size (Full Size) by default, and fills the preview mode library 111 with an image with a resolution size of binninig size, where the resolution size of full size is larger than that of binninig size. The Active ArraySize tag 107, the Pixel ArraySize tag 108, and the Precorrection ArraySize tag 109 at the hardware abstraction layer obtain the images with a resolution size of full size from the capture mode library 110 at the kernel layer for automatic filling. To ensure that a compatibility test tool (Compatibility Test Suite, CTS) test is passed, the MTK_SCALER_AVAILABLE_STREAM_CONFIGURATIONS_WITH_DURATIONS tag 106 at the hardware abstraction layer needs to be filled with the image with a resolution size of full size. In this embodiment, a binninig size image may superimpose values of N adjacent pixels of the image and output the values as one pixel value. Therefore, the binninig size image reduces the resolution of the image. For example, FIG. 3 shows a schematic diagram of an example of a binninig size image. Each square in a left image in FIG. 3 represents a pixel, and the binninig size image combines four pixels in the left image in FIG. 3 as one pixel for use. It should be noted that, the binninig size image increases the light sensitivity and output rate of the image at the expense of the image resolution. In an embodiment, when the four pixels are combined into one pixel, the resolution of the full size image is 12 M, and the resolution of the binninig size image is 3 M. In this embodiment, the android.scaler.availableStreamConfigurations tag 102 at the application framework layer obtains the image with an image resolution of full size from the MTK_SCALER_AVAILABLE_STREAM_CONFIGURATIONS_WITH_DURATIONS tag 106 at the hardware abstraction layer. The android.sensor.info.activeArraySize tag 103 obtains the image with an image resolution of full size from the Active ArraySize tag 107, the android.sensor.info.pixelArraySize tag 104 obtains the image with an image resolution of full size with which the Pixel ArraySize tag 108 is filled from the Pixel ArraySize tag 108, and the android.sensor.info.precorrectionactiveArraySize tag 105 obtains the image with an image resolution of full size from the Precorrection ArraySize tag 109. In this embodiment, when invoking the image data, the application 101 obtains the image with an image resolution of full size from the android.scaler.availableStreamConfigurations tag 102 at the application framework layer. As a result, when the application 101 processes the invoked full size image, the image exceeds the available memory of the application 101, causing the application to crash.

Figure 4:
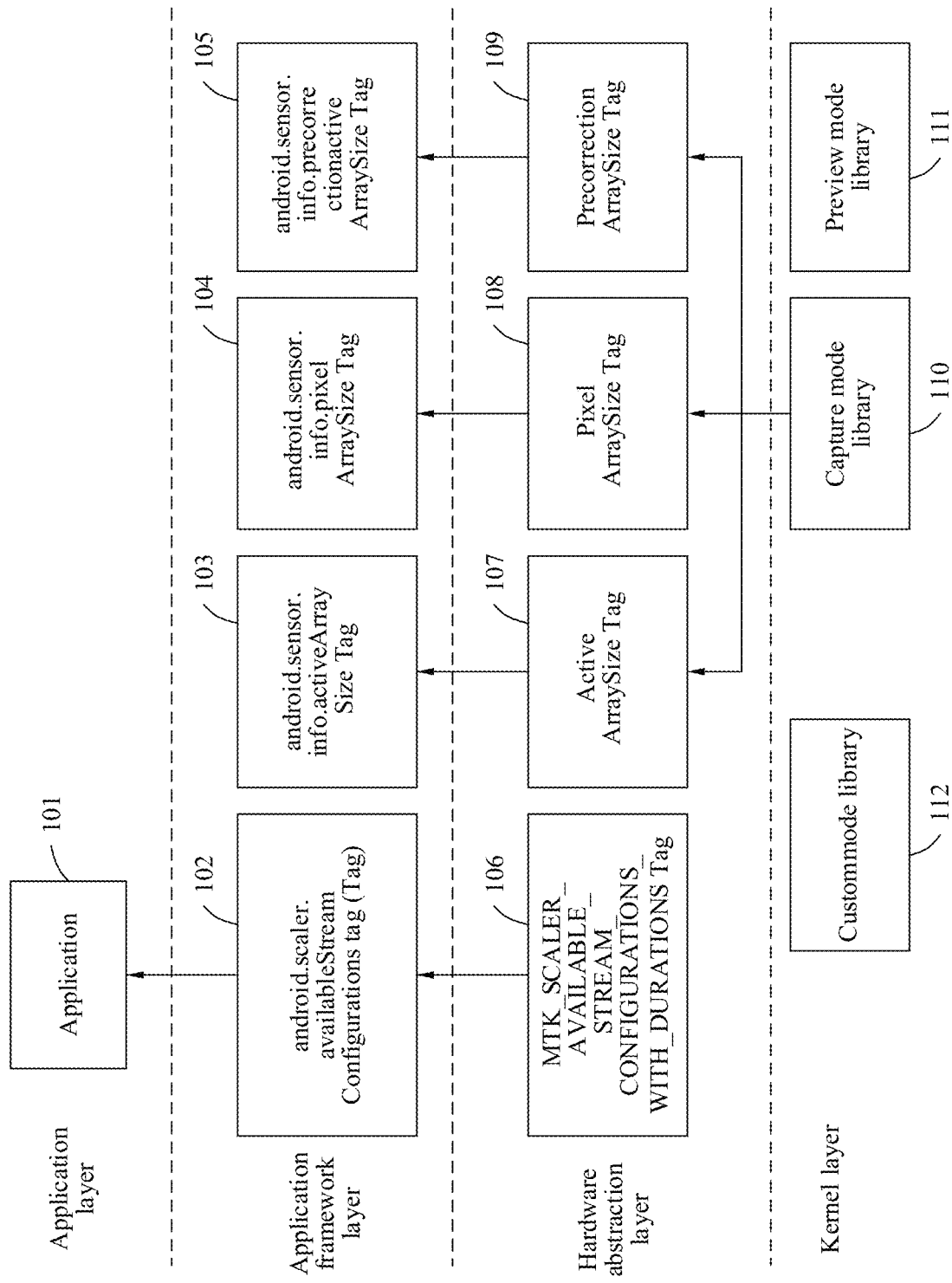
FIG. 4 is a flowchart of an image data invoking system for an application according to another embodiment of this application.

In order to resolve the problem of application crashing caused by the excessive resolution size of the image invoked by the application 101, the embodiments of this application provide another image data invoking system 100 for an application. FIG. 4 shows a structural block diagram of an image data invoking system 100 for an application according to an embodiment of this application. In this embodiment, a resolution size of an image in the capture mode library 110 at the kernel layer is filled as binning size, and a resolution size of an image in the MTK_SCALER_AVAILABLE_STREAM_CONFIGURATIONS_WITH_DURATIONS tag 106 at the hardware abstraction layer is filled as binning size. In this embodiment, after the resolution size of the image in the capture mode library 110 at the kernel layer is filled as binning size, the Active ArraySize tag 107, the Pixel ArraySize tag 108, and the Precorrection ArraySize tag 109 at the hardware abstraction layer obtain the image with a resolution size of binning size from the capture mode library 110 at the kernel layer for automatic filling. The android.sensor.info.activeArraySize tag 103 at the application framework layer obtains the image with a resolution size of binning size from the Active ArraySize tag 107 for automatic filling. The android.sensor.info.pixelArraySize tag 104 obtains the image with a resolution size of binning size from the Pixel ArraySize tag 108 for automatic filling, thereby ensuring that the image data invoking system 100 for an application passes the CTS test. In this embodiment, after the resolution size of the image in the MTK_SCALER_AVAILABLE_STREAM_CONFIGURATIONS_WITH_DURATIONS tag 106 at the hardware abstraction layer is filled as binning size, when the application 101 invokes image data, the android.scaler.availableStreamConfigurations tag 102 at the application framework layer reports the obtained image with a resolution size of binning size to the application 101, so that when the application 101 processes the invoked image with a resolution size of binning size, the image does not exceed the available memory of the application 101, thereby avoiding the crashing problem of the application 101.

It should be noted that, since the resolution sizes of the images filled in the capture mode library 110 and the preview mode library 111 at the kernel layer are binning size, it cannot be ensured that the application 101 selects image data from the preview mode library 111 when invoking the image data. In other words, the application 101 may select the image data from the capture mode library 110. Since image parameters such as color, brightness, white balance and other image effect parameters are bound to the preview mode library, if the image data in the preview mode library 111 is not selected when the application 101 invokes the image data, but the image data in the capture mode library 110 is selected, the application 101 cannot obtain the image parameter data in the preview mode library 111, such as color, brightness, white balance, and other image effect parameter data. Therefore, to ensure that the application 101 obtains the image parameter data in the preview mode library 111, the image data invoking system 100 for an application synchronizes the image parameter data in the preview mode library 111 into the capture mode library 110. It should be noted that, synchronizing the image parameter data in the preview mode library 111 into the capture mode library 110 requires additional work.

In this embodiment, the image with a resolution size of full size in the capture mode library 110 is used for a high pixel mode of a self-developed camera by default. After the resolution size of the image in the capture mode library 110 is filled as binning size, to ensure that the application 101 invokes the image with a resolution size of full size, a custom mode library 112 needs to be newly created at the kernel layer. Therefore, when the application 101 invokes the image in the high pixel mode of the self-developed camera, an original public code of the electronic device 100 or the MTK platform needs to be modified, to invoke the image with a resolution size of full size from the newly created custom mode library 112. In addition, if there is image parameter data related to the image with a resolution size of full size in the capture mode library 110, the image parameter data related to the image with a resolution size of full size in the capture mode library 110 is synchronized into the custom mode library 112, which complicates the process of the third application 101 invoking the image with a resolution size of full size.

Figure 5:
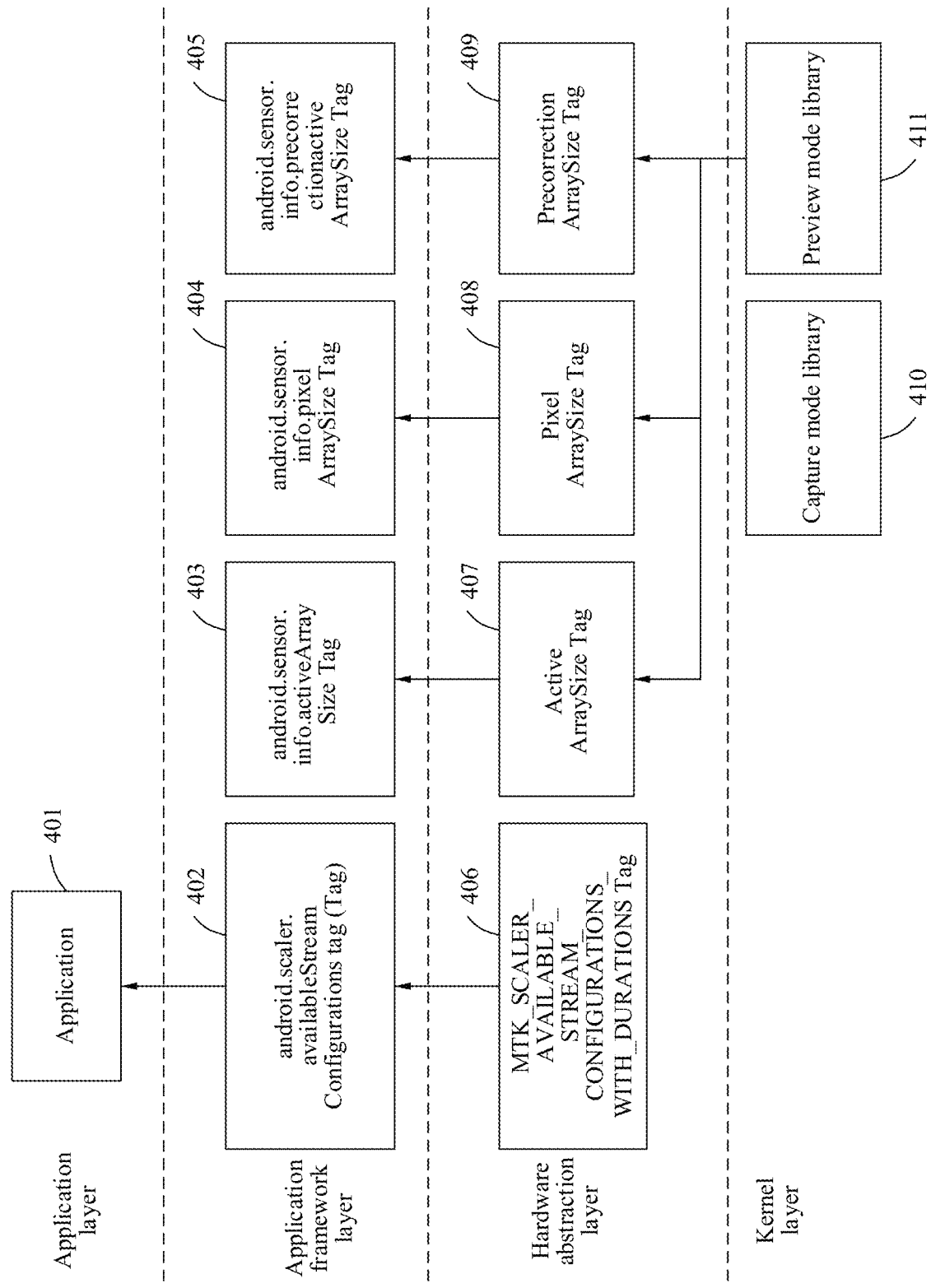
FIG. 5 is a flowchart of an image data invoking system for an application according to another embodiment of this application.

To resolve the problem of complicating the process of the third application 101 invoking the image with a resolution size of full size, the embodiments of this application further provide another image data invoking system for an application. FIG. 5 shows a structural block diagram of an image data invoking system for an application according to an embodiment of this application. In this embodiment, a capture mode library 410 is filled with an image with a resolution size of full size and image parameter data related to the image with a resolution size of full size, and a preview mode library 411 is filled with an image with a resolution size of binning size and image parameter data related to the image with a resolution size of binning size. Image data and the image parameter data in the capture mode library 410 are used for invoking in a high pixel mode of a self-developed camera, and image data and the image parameter data in the preview mode library 411 are invoked in other modes other than the high pixel mode of the self-developed camera and by the application 401.

In this embodiment, an Active ArraySize tag 407, a Pixel ArraySize tag 408, and a Precorrection ArraySize tag 409 at the hardware abstraction layer obtain the image with a resolution size of binning size from the preview mode library 411. To ensure that the image data invoking system 100 for an application passes the CTS test of the electronic device 100 or the MTK platform, an MTK_SCALER_A-VAILABLE_STREAM_CONFIGURATIONS_WITH_DU-RATIONS tag 406 at the hardware abstraction layer is manually filled with the image with a resolution size of binning size. An android.scaler.availableStreamConfigurations tag 402 at the application framework layer obtains the image with an image resolution of binning size from the MTK_SCALER_AVAILABLE_STREAM_CONFIGURA-TIONS_WITH_DURATIONS tag 406 at the hardware abstraction layer. An android.sensor.info.activeArraySize tag 403 at the application framework layer obtains the image with an image resolution of binning size from the Active ArraySize tag 407 at the hardware abstraction layer. An android.sensor.info.pixelArraySize tag 404 at the application framework layer obtains the image with an image resolution of binning size from the Pixel ArraySize tag 408 at the hardware abstraction layer. An android.sensor. info.precorrectionactiveArraySize tag 405 at the application framework layer obtains the image with an image resolution of binning size from the Precorrection ArraySize tag 409 at the hardware abstraction layer. When invoking image data, the application 401 obtains the image with an image resolution of binning size from the android.scaler.availableStreamConfigurations tag 402 at the application framework layer.

The resolution size of the image obtained by the application 401 from the android.scaler.availableStreamConfigurations tag 402 at the application framework layer is binning size. Therefore, the image with a resolution size of binning size invoked by the application 401 does not exceed the available memory of the application 401, to avoid the crashing problem of the application 401.

Figure 6:
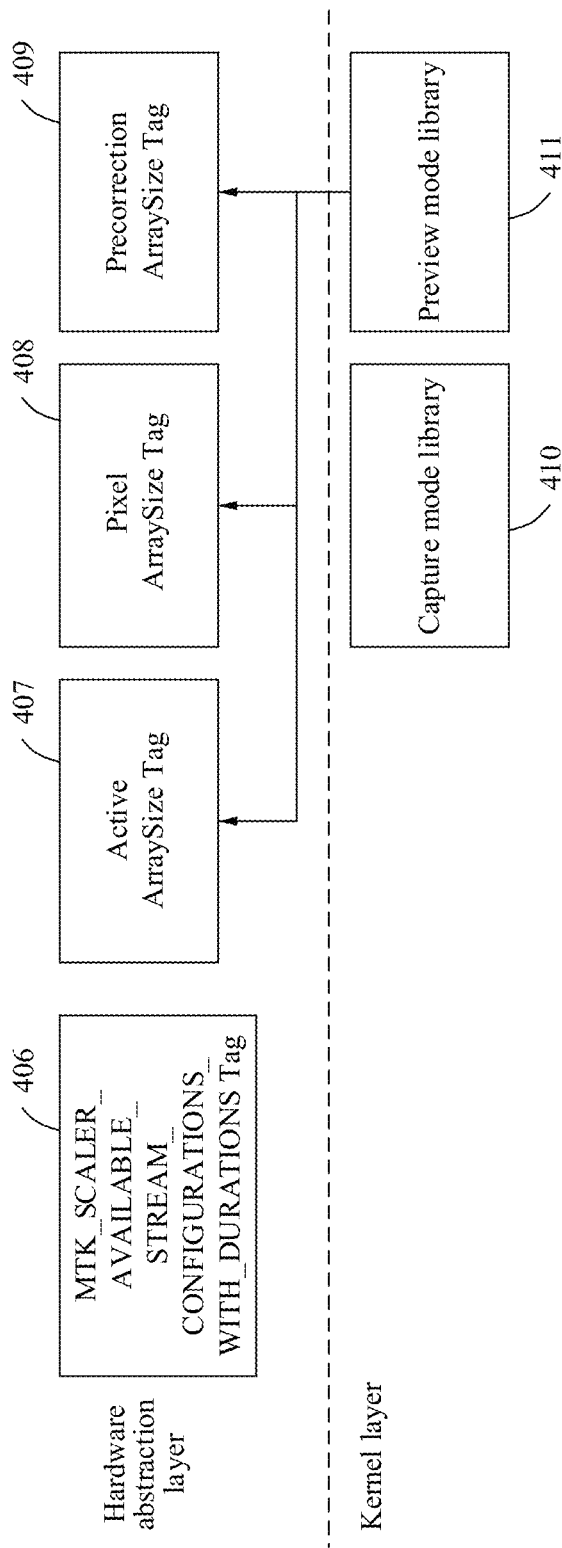
FIG. 6 is a schematic diagram of an image data invoking system for an application filling an image with a resolution size of binning size according to an embodiment of this application.
Figure 7:
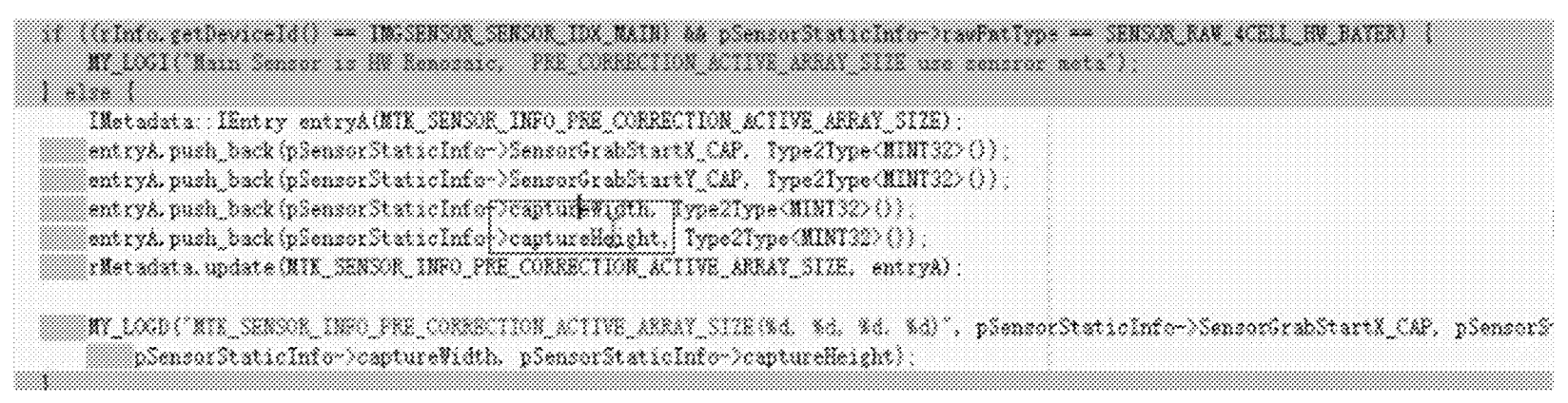

In this embodiment, the image resolution size includes a width of the image and a height of the image, and the width of the image and the height of the image are in units of pixels. When the preview mode library 411 is filled with the image with a resolution size of binning size, the width of the image and the height of the image are filled into the preview mode library 411. Specifically, FIG. 6 shows a schematic diagram of an image data invoking system for an application filling an image with a resolution size of binning size according to an embodiment of this application. When the image data invoking system for an application identifies an entry file HalSensorList.cpp of a sensor of the electronic device 100 or the MTK platform, the image data invoking system for an application fills a preview width and a preview height of an image into the preview mode library 411. The preview width represents a width of an image with a resolution size of binning size, and the preview height represents a height of the image with a resolution size of binning size. In this embodiment, the preview width of the image is filled into the preview mode library 411 through an instruction statement entryA.push_back (pSensorStaticInfo-→captureWidth, Type2Type <MINT32>( )), and the preview height of the image is filled into the preview mode library 411 (refer to FIG. 7) through an instruction statement entryA.push_back (pSensorStaticInfo→captureHeight, Type2Type <MINT32>( )).

In this embodiment, image resolution sizes of the capture mode library 410 and the preview mode library 411 are different, which can ensure that the application 401 can invoke image data from the preview mode library 411 when invoking the image data. Since image parameters related to the image data are bound to the preview mode library 411, no image parameters bound to the preview mode library 411 need to be synchronized into the capture mode library 410, which reduces process steps of application invoking.

In this embodiment, during invoking in a high pixel mode, the application 401 invokes the image with an image size of full size from the capture mode library 410, without changing an original code, and no invoke error occurs when the capture mode library 110 is selected during invoking in the high pixel mode. Therefore, the inventive solution of this embodiment is simple and easy to implement.

Figure 8:
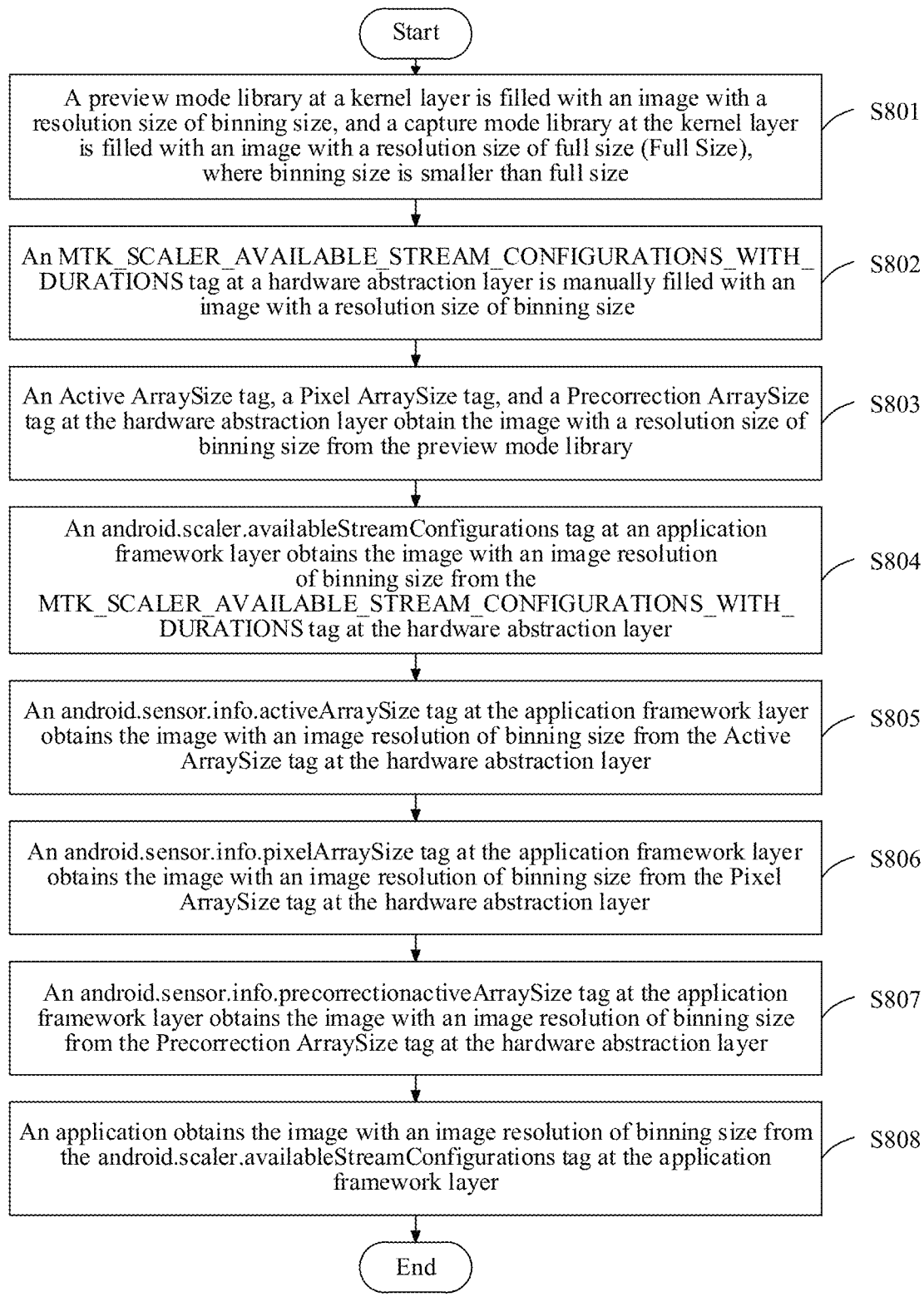
FIG. 8 is a flowchart of an image data invoking method for an application according to an embodiment of this application.

The embodiments of this application further provide an image data invoking method for an application. FIG. 8 shows a flowchart of an image data invoking method for an application according to an implementation of this application. The method specifically includes the following steps.

Step S801. A preview mode library 411 at a kernel layer is filled with an image with a resolution size of binning size, and a capture mode library 410 at the kernel layer is filled with an image with a resolution size of full size, where binninig size is smaller than full size;

Step S802. An MTK_SCALER_AVAILABLE_STREAM_CONFIGURATIONS_WITH_DURATIONS tag 406 at a hardware abstraction layer is filled with an image with a resolution size of binning size. In this embodiment, the image with a resolution size of binning size is manually filled in the MTK_SCALER_AVAILABLE_STREAM_CONFIGURATIONS_WITH_DURATIONS tag 406 at the hardware abstraction layer.

Step S803. An Active ArraySize tag 407, a Pixel ArraySize tag 408, and a Precorrection ArraySize tag 409 at the hardware abstraction layer obtain the image with a resolution size of binning size from the preview mode library 411.

Step S804. An android.scaler.availableStreamConfigurations tag 402 at an application framework layer obtains the image with an image resolution of binning size from the MTK_SCALER_AVAILABLE_STREAM_CONFIGURATIONS_WITH_DURATIONS tag 406 at the hardware abstraction layer.

Step S805. An android.sensor.info.activeArraySize tag 403 at the application framework layer obtains the image with an image resolution of binning size from the Active ArraySize tag 407 at the hardware abstraction layer.

Step S806. An android.sensor.info.pixelArraySize tag 404 at the application framework layer obtains the image with an image resolution of binning size from the Pixel ArraySize tag 408 at the hardware abstraction layer.

Step S807. An android.sensor.info.precorrectionactiveArraySize tag 405 at the application framework layer obtains the image with an image resolution of binning size from the Precorrection ArraySize tag 409 at the hardware abstraction layer.

Step S808. An application 101 obtains the image with an image resolution of binning size from the android.scaler.availableStreamConfigurations tag 402 at the application framework layer.

In an embodiment of this application, the preview mode library 411 at the kernel layer is also filled with image parameter data related to the image with a resolution size of binning size, and the image parameter data includes at least color, brightness, and white balance.

In an embodiment of this application, the method further includes: filling the capture mode library 410 at the kernel layer with an image with a resolution size of full size and image parameter data related to the image with a resolution size of full size, and filling the preview mode library 411 with an image with a resolution size of binning size and image parameter data related to the image with a resolution size of binning size. In this embodiment, image data and the image parameter data in the capture mode library 410 are used for invoking in a high pixel mode of a self-developed camera, and image data the image parameter data in the preview mode library 411 are invoked in other modes other than the high pixel mode of the self-developed camera and by the application 401.

In an embodiment of this application, when the electronic device 100 or the MTK platform identifies an entry file HalSensorList.cpp of a sensor, a preview width and a preview height of the image is filled into the preview mode library, where the preview width is a width of the image with a resolution size of binning size, and the preview height is a height of the image with a resolution size of binning size.

Figure 9:
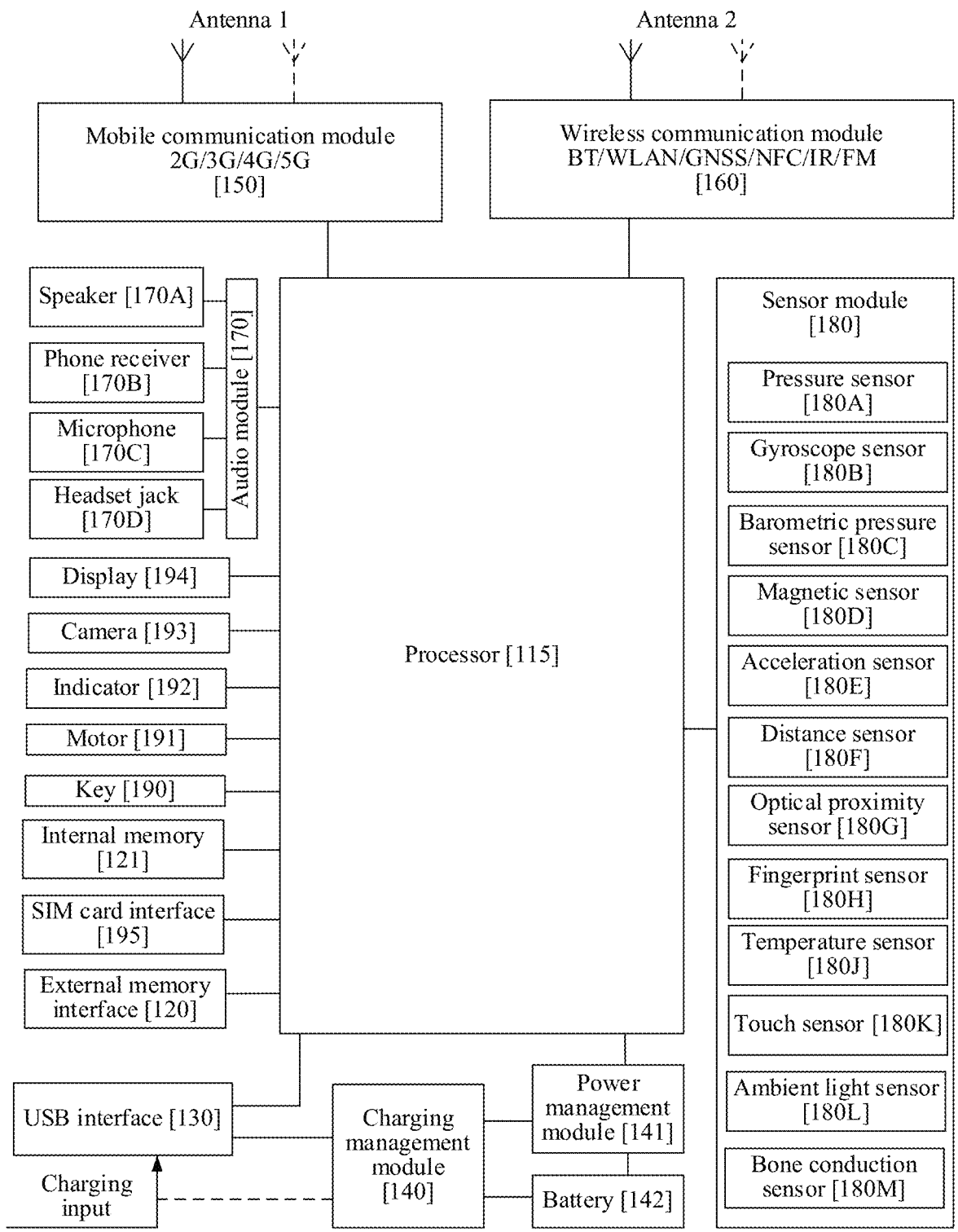
FIG. 9 is a schematic diagram of a hardware structure of an electronic device according to an embodiment of this application.

FIG. 9 shows a schematic diagram of a hardware structure of an electronic device 100 according to an embodiment of this application. The electronic device 100 may be a mobile phone, a tablet computer, a desktop computer, a laptop computer, a handheld computer, a notebook computer, an ultra-mobile personal computer (ultra-mobile personal computer, UMPC), a netbook, as well as a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart home device, and/or a smart city device. Some embodiments of this application do not specifically limit the specific type of the electronic device 100. In other embodiments, the electronic device 100 and the MTK platform may be a same device.

The electronic device 100 may include a processor 115, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components in the figure may be implemented by hardware, software, or a combination of software and hardware.

The processor 115 may include one or more processing units. For example, the processor 115 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operating control signal according to an instruction operation code and a sequence signal, to complete control of fetching and executing an instruction.

A memory may be further configured in the processor 115, to store an instruction and data. In some embodiments, the memory in the processor 115 is a cache. The memory may store an instruction or data that has just been used or cyclically used by the processor 115. If the processor 115 needs to use the instruction or the data again, the processor may directly invoke the instruction or the data from the memory, to avoid repeated access and reduce a waiting time of the processor 115, thereby improving system efficiency.

In some embodiments, the processor 115 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a two-way synchronization serial bus, and includes a serial data line (serial data line, SDA) and a serial clock line (derail clock line, SCL). In some embodiments, the processor 115 may include a plurality of groups of I2C buses. The processor 115 may be coupled to the touch sensor 180K, a charger, a flash light, the camera 193, and the like through different I2C bus interfaces. For example, the processor 115 may be coupled to the touch sensor 180K through the I2C interface, so that the processor 115 communicates with the touch sensor 180K through the I2C bus interface, to implement a touch function of the electronic device 100.

The I2S interface may be used for audio communication. In some embodiments, the processor 115 may include a plurality of groups of I2S buses. The processor 115 may be coupled to the audio module 170 through the I2S bus, to implement communication between the processor 115 and the audio module 170. In some embodiments, the audio module 170 may transfer an audio signal to the wireless communication module 160 through the I2S interface, to implement a function of answering a call through a Bluetooth headset.

The PCM interface may also be used for audio communication, and sampling, quantization, and encoding of an analog signal. In some embodiments, the audio module 170 may be coupled to the wireless communication module 160 through the PCM bus interface. In some embodiments, the audio module 170 may transfer an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is typically used to connect the processor 115 with the wireless communication module 160. For example, the processor 115 communicates with a Bluetooth module in the wireless communication module 160 through a UART interface, to implement a Bluetooth function. In some embodiments, the audio module 170 may transfer an audio signal to the wireless communication module 160 through a UART interface, to implement a function of playing music through a Bluetooth headset.

The MIPI interface may be configured to connect the processor 115 to a peripheral device such as the display 194 and the camera 193. The MIPI interface includes a camera serial interface (camera serial interface, CSI), a display serial interface (display serial interface, DSI), and the like. In some embodiments, the processor 115 communicates with the camera 193 through the CSI interface, to implement a photographing function of the electronic device 100. The processor 115 communicates with the display 194 through a DSI interface, to implement a display function of the electronic device 100.

The GPIO interface may be configured through software. The GPIO interface may be configured to transmit a control signal, or may be configured to transmit a data signal. In some embodiments, the GPIO interface may be configured to connect the processor 115 to the camera 193, the display 194, the wireless communication module 160, the audio module 170, the sensor module 180, and the like. The GPIO interface may also be configured as an I2C interface, an I2S interface, a UART interface, an MIPI interface, and the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio through the headset. The interface may alternatively be configured to connect to another electronic device 100 such as an AR device.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may supply power to the electronic device 100 through the power management module 141 while charging the battery 142.

The power management module 141 is configured to connect to the battery 142, the charging management module 140, and the processor 115. The power management module 141 receives an input of the battery 142 and/or the charging management module 140, to supply power to the processor 115, the internal memory 121, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 115. In some other embodiments, the power management module 141 and the charging management module 140 may further be configured in the same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the electronic device 100 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 115. In some embodiments, at least some function modules of the mobile communication module 150 and at least some modules of the processor 115 may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The AP outputs a sound signal through an audio device (which is not limited to the speaker 170A, the phone receiver 170B, and the like), or displays an image or a video through the display 194. In some embodiments, the modem processor may be an independent device. In some other embodiments, the modem processor may be independent of the processor 115, and the modem processor and the mobile communication module 150 or another function module may be disposed in the same component.

The wireless communication module 160 may provide a solution for wireless communication including a wireless local area network (wireless local area network, WLAN) (such as a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 100. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 115. The wireless communication module 160 may alternatively receive a to-be-sent signal from the processor 115, perform frequency modulation and amplification on the to-be-sent signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 may communicate with a network and another device through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the AP, and the like. The GPU is a microprocessor for image processing, and is connected to the display 194 and the AP. The GPU is configured to perform mathematical and geometric calculation, and is configured to render graphics. The processor 115 may include one or more GPUs, and execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 100 may include one or N displays 194, and N is a positive integer greater than 1.

The electronic device 100 may implement a photographing function through the ISP, the camera 193, the video codec, the GPU, the display 194, the AP, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on image noise point, brightness, and skin tone. The ISP may alternatively optimize parameters such as exposure and a color temperature of a photographing scenario. In some embodiments, the ISP may be disposed in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 100 may include one or N cameras 193, and N is a positive integer greater than 1.

The DSP is configured to process a digital signal, and may further process another digital signal in addition to a digital image signal. For example, when the electronic device 100 performs frequency selection, the DSP is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 100, for example, image recognition, facial recognition, voice recognition, and text understanding.

The internal memory 121 may include one or more random access memories (random access memories, RAMs) and one or more non-volatile memories (non-volatile memories, NVMs).

The random access memories may include a static random access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth-generation DDR SDRAM is generally referred to as DDR5 SDRAM), and the like.

The non-volatile memory may include a disk storage device and a flash memory (flash memory).

The flash memory may be divided into NOR flash, NAND flash, 3D NAND flash, and the like according to operating principles, may include a single-level memory cell (single-level memory cell, SLC), a multi-level memory cell (multi-level memory cell, SLC), a triple-level cell (triple-level cell, TLC), a quad-level cell (quad-level cell, QLC), and the like according to a memory cell potential order, and may include a universal flash storage (universal flash storage, UFS), an embedded multimedia card (embedded multimedia Card, eMMC), and the like according to a storage specification.

The random access memory may be directly read and written by the processor 115, may be configured to store an executable program (for example, a machine instruction) of an operating system or other running programs, and may also be configured to store user and application data.

The non-volatile memory may also store an executable program and store user and application data, and the like, which may be loaded into the random access memory in advance for the processor 115 to directly read and write.

The external memory interface 120 may be configured to connect to an external non-volatile memory, to expand a storage capability of the electronic device 100. The external non-volatile memory communicates with the processor 115 through the external memory interface 120, to implement a data storage function, for example, storing a file such as a music or a video in the external non-volatile memory.

The internal memory 121 or the external memory interface 120 is configured to store one or more computer programs. The one or more computer programs are configured to be executed by the processor 115. The one or more computer programs include a plurality of instructions. The plurality of instructions, when executed by the processor 115, can implement the image data invoking method for an application performed on the electronic device 100 in the foregoing embodiment, to realize a log acquisition function of the electronic device 100.

The electronic device 100 may implement an audio function such as music playback or recording through the audio module 170, the loudspeaker 170A, the phone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 115, or some function modules of the audio module 170 are disposed in the processor 115.

The speaker 170A, also referred to as a "horn", is configured to convert an audio electrical signal into a sound signal. Music can be listened to or a hands-free call can be answered through the speaker 170A in the electronic device 100.

The phone receiver 170B, also referred to as a "receiver", is configured to convert an audio electrical signal into a sound signal. When the electronic device 100 is configured to answer a call or receive voice information, the phone receiver 170B may be put close to a human ear to receive a voice.

The microphone 170C, also referred to as a "mouthpiece" or a "megaphone", is configured to convert a sound signal into an electrical signal. When making a call or sending voice information, a user may make a sound near the microphone 170C through the mouth of the user, to input a sound signal into the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal 100 platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The electronic device 100 determines strength of pressure based on a change of the capacitance. When a touch operation is performed on the display 194, the electronic device 100 detects strength of the touch operation through the pressure sensor 180A. The electronic device 100 may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device 100. In some embodiments, an angular velocity of the electronic device 100 around three axes that is, x, y, and z axes) may be determined through the gyroscope sensor 180B. The gyroscope sensor 180B may be used for image stabilization during photographing. For example, when the shutter is pressed, the gyro sensor 180B detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyro sensor 180B may also be used in navigation and a motion sensing game scenario.

The barometric pressure sensor 180C is configured to measure barometric pressure. In some embodiments, the electronic device 100 calculates an altitude through a barometric pressure value measured by the barometric pressure sensor 180C, to assist in positioning and navigation.

The magnetic sensor 180D may include a Hall effect sensor. The electronic device 100 may detect opening and closing of a flip holster through the magnetic sensor 180D. In some embodiments, when the electronic device 100 is a flip phone, the electronic device 100 may detect opening and closing of a flip cover through the magnetic sensor 180D, and further set features such as automatic unlocking of the flip cover according to the detected opening and closing state of the holster or opening and closing state of the flip cover.

The acceleration sensor 180E may detect acceleration values of the electronic device 100 in all directions (generally in three axes). When the electronic device 100 is stationary, a magnitude and a direction of gravity may be detected. The acceleration sensor may be further configured to recognize a posture of the electronic device 100, and is applied to an application such as switching between landscape orientation and portrait orientation or a pedometer.

The distance sensor 180F is configured to measure a distance. The electronic device 100 may measure a distance through infrared or laser. In some embodiments, in a photographing scenario, the electronic device 100 may measure a distance through the distance sensor 180F, to implement quick focusing.

The optical proximity sensor 180G may include, for example, a light-emitting diode (LED) and an optical detector such as a photodiode. The light emitting diode may be an infrared light emitting diode. The electronic device 100 may emit infrared light through the light-emitting diode. The electronic device 100 detects infrared reflected light from a nearby object through the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, through the optical proximity sensor 180G, that a user holds the electronic device 100 close to an ear for a call, so that automatic screen-off is implemented to achieve power saving. The optical proximity sensor 180G may alternatively be used in a leather case mode or a pocket mode to automatically unlock or lock the screen.

The ambient light sensor 180L is configured to sense luminance of ambient light. The electronic device 100 may adaptively adjust a luminance of the display 194 according to perceived brightness of the ambient light. The ambient light sensor 180L may be further configured to automatically adjust white balance during photo taking. The ambient light sensor 180L may further cooperate with the optical proximity sensor 180G to detect whether the electronic device 100 is in a pocket, so as to prevent an accidental touch.

The fingerprint sensor 180H is configured to collect a fingerprint. The electronic device 100 may implement fingerprint unlock, application lock accessing, fingerprint photographing, fingerprint-based call answering, and the like through a feature of the collected fingerprint.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 reduces performance of a processor near the temperature sensor 180J, to reduce power consumption and implement heat protection. In some other embodiments, when the temperature is below another threshold, the electronic device 100 heats the battery 142, to prevent the low temperature from causing the electronic device 100 to shut down abnormally. In some other embodiments, when the temperature is below still another threshold, the electronic device 100 boosts an output voltage of the battery 142 to prevent abnormal shutdown caused by the low temperature.

The touch sensor 180K is also referred to as a "touch device". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation through the display 194. In some other embodiments, the touch sensor 180K may be alternatively disposed on a surface of the electronic device 100, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may parse out a voice signal based on the vibration signal of the vibration bone of the vocal-cord part that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key, or a touch-type key. The electronic device 100 may receive a key input, and generate a key signal input related to user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the display 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces. N is a positive integer greater than 1. The SIM card interface 195 can support a nano SIM card, a micro SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The electronic device 100 interacts with a network through a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

This embodiment further provides a computer program product. When the computer program product runs on a computer, the computer is enabled to perform the related steps, to implement the image data invoking method for an application in the foregoing embodiment.

In addition, some embodiments of this application further provide an apparatus. The apparatus may be specifically a chip, a component, or a module. The apparatus may include a processor and a memory that are connected. The memory is configured to store computer executable instructions, and when the apparatus runs, the processor may execute the computer executable instructions stored in the memory, so that the chip performs the image data invoking method for an application in the foregoing method embodiments.

The electronic device, the computer storage medium, the computer program product, or the chip provided in this embodiment may be configured to perform the corresponding method provided above. Therefore, for beneficial effects that can be achieved, reference may be made to the beneficial effects of the corresponding method provided above. Details are not described herein again.

Through the descriptions of the foregoing implementations, a person skilled in the art may clearly understand that, for the purpose of convenient and brief description, only division of the foregoing function modules is used as an example for description. In actual application, the foregoing functions may be allocated to and completed by different function modules according to requirements. That is, an internal structure of an apparatus is divided into different function modules to complete all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to an actual requirement to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in some embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store a program code, such as a USB flash drive, a removable hard disk, a read-only memory (Read-Only Memory, ROM), a random access memory (Random Access Memory, RAM), a magnetic disk, a compact disc, or the like.

Finally, it should be noted that the foregoing embodiments are merely intended for illustrating the technical solutions of some embodiments of this application, but not for limiting this application. Although some embodiments of this application are described in detail with reference to the preferable embodiments, a person of ordinary skill in the art is to understand that the technical solutions of some embodiments of this application may be modified or equivalently replaced without departing from the spirit and scope of the technical solutions of some embodiments of this application.

What is claimed is:

1. A system, comprising:
    a memory;
    at least one processor coupled to the memory;
    a capture mode library, set in a kernel layer, wherein the capture mode library is filled with an image with an image resolution size of a full size;

a preview mode library, set in the kernel layer, wherein the preview mode library is filled with a second image with a second image resolution size of a binning size, and the binning size is smaller than the full size;

a first tag, set in a hardware abstraction layer, wherein the first tag is filled with the second image with the second image resolution size of the binning size;

a second tag, set in an application framework layer, wherein the second tag obtains the second image with the second image resolution size of the binning size from the first tag; and an application stored in the memory, set at an application layer, wherein the application obtains the second image with the second image resolution size of the binning size from the second tag.

2. The system according to claim 1, wherein the system further comprises a third tag, the third tag is set in the hardware abstraction layer, the third tag comprises three subtags, and the three subtags obtain the second image with the second image resolution size of the binning size from the preview mode library.

3. The system according to claim 2, wherein the system further comprises a fourth tag, the fourth tag is set in the application framework layer, the fourth tag comprises three subtags, the three subtags of the fourth tag correspond to the three subtags of the third tag, and each subtag of the fourth tag obtains the second image with the second image resolution size of the binning size from a corresponding subtag of the third tag.

4. The system according to claim 1, wherein the image resolution size comprises a width of the image and a height of the image.

5. The system according to claim 4, wherein when the system identifies an entry file HalSensorList.cpp of a sensor, wherein a preview width and a preview height of the image are filled into the preview mode library, wherein the preview width is a second width of the second image with the second image resolution size of the binning size, and the preview height is a second height of the second image with the second image resolution size of the binning size.

6. The system according to claim 5, wherein the system fills the preview width of the image into the preview mode library through an instruction statement entryA.push_back (pSensorStaticInfo→captureWidth, Type2Type<MINT32>( )), and fills the preview height of the image into the preview mode library through a second instruction statement entryA.push_back (pSensorStaticInfo→captureHeight, Type2Type<MINT32>( )).

7. The system according to claim 1, wherein the application invokes the image with the image resolution size of the full size from the capture mode library in a high pixel mode.

8. The system according to claim 1, wherein image data and image parameter data are stored in the capture mode library and the preview mode library, and the image parameter data comprises at least quality parameters.

9. A method, comprising:
filling a preview mode library at a kernel layer with a second image with a second image resolution size of a binning size, and filling a capture mode library at the kernel layer with an image with an image resolution size of a full size, wherein the binning size is smaller than the full size;

filling a first tag at a hardware abstraction layer with the second image with the second image resolution size of the binning size;

obtaining, by three subtags of a third tag at the hardware abstraction layer, the second image with the second image resolution size of the binning size from the preview mode library;

obtaining, by a second tag at an application framework layer, the second image with the second image resolution size of the binning size from the first tag; and obtaining, by three subtags of a fourth tag at the application framework layer, the second image with the second image resolution size of the binning size from the three subtags of the third tag at the hardware abstraction layer correspondingly.

10. The method according to claim 9, wherein the image resolution size comprises a width of the image and a height of the image.

11. The method according to claim 10, wherein the method further comprises:
when an entry file HalSensorList.cpp of a sensor is identified, filling a preview width and a preview height of the image into the preview mode library, wherein the preview width is a second width of the second image with the second image resolution size of the binning size, and the preview height is a second height of the second image with the second image resolution size of the binning size.

12. The method according to claim 11, wherein the method further comprises:
filling the preview width of the image into the preview mode library through an instruction statement entryA.push_back (pSensorStaticInfo→captureWidth, Type2Type <MINT32>( )); and
filling the preview height of the image into the preview mode library through a second instruction statement entryA.push_back (pSensorStaticInfo→captureHeight, Type2Type <MINT32>( )).

13. The method according to claim 9, wherein the method further comprises:
invoking, by an application, the image with the image resolution size of the full size from the capture mode library in a high pixel mode.

14. The method according to claim 9, wherein image data and image parameter data are stored in the capture mode library and the preview mode library, and the image parameter data comprises at least quality parameters.

15. An electronic device, comprising:
a non-transitory memory storing instructions; and
a processor coupled to the non-transitory memory, the instructions being executed by the processor to cause the electronic device to:
fill a preview mode library with a second image with a second image resolution size of a binning size;
fill a capture mode library with an image with an image resolution size of a full size, wherein the binning size is smaller than the full size;
fill a first tag with the second image with the second image resolution size of the binning size;
obtain, by three subtags of a third tag, the second image with the second image resolution size of the binning size from the preview mode library;
obtain, by a second tag, the second image with the second image resolution size of the binning size from the first tag; and
obtain, by three subtags of a fourth tag, the second image with the second image resolution size of the binning size from the three subtags of the third tag correspondingly.

16. The electronic device according to claim 15, wherein the image resolution size comprises a width of the image and a height of the image.

17. The electronic device according to claim 15, the instructions further cause the electronic device to:
    when an entry file of a sensor is identified, fill a preview width and a preview height of the image into the preview mode library, wherein the preview width is a width of the second image with the second image resolution size of the binning size, and the preview height is a height of the second image with the second image resolution size of the binning size.

18. The electronic device according to claim 17, the instructions further cause the electronic device to:
    fill the preview width of the image into the preview mode library through an instruction statement entryA.push_back (pSensorStaticInfo→captureWidth, Type2Type <MINT32>( )); and
    fill the preview height of the image into the preview mode library through a second instruction statement entryA. push_back (pSensorStaticInfo→captureHeight, Type2Type <MINT32>( )).

19. The electronic device according to claim 15, the instructions further cause the electronic device to:
    invoke, by an application, the image with the image resolution size of the full size from the capture mode library in a high pixel mode.

20. The electronic device according to claim 15, wherein image data and image parameter data are stored in the capture mode library and the preview mode library, and the image parameter data comprises at least quality parameters.

* * * * *